United States Patent [19]
Brinkley

[11] Patent Number: 5,229,006
[45] Date of Patent: Jul. 20, 1993

[54] METHOD OF RECOVERING OIL-BASED FLUID AND APPARATUS

[76] Inventor: Herman E. Brinkley, c/o NuLife Inc. of Illinois, P.O. Box 450, Lawrenceville, Ill. 62439

[21] Appl. No.: 812,406

[22] Filed: Dec. 23, 1991

Related U.S. Application Data

[63] Continuation-in-part of Ser. No. 700,493, May 15, 1991.

[51] Int. Cl.$^5$ .................. C02F 1/40; E02B 15/04
[52] U.S. Cl. .................. 210/671; 210/242.4; 210/691; 210/791; 210/924
[58] Field of Search ........... 210/680, 691, 693, 242.4, 210/924, 791, 671

[56] References Cited

U.S. PATENT DOCUMENTS

| | | |
|---|---|---|
| Re. 31,087 | 11/1982 | Sohl ........................ 210/924 |
| 3,146,192 | 8/1964 | McClintock ............... 210/693 |
| 3,147,216 | 9/1964 | Oemler ..................... 210/693 |
| 3,667,608 | 6/1972 | Burroughs et al. ........ 210/242.4 |
| 3,679,058 | 7/1972 | Smith ....................... 210/924 |
| 3,739,913 | 6/1973 | Bogosian .................. 210/924 |
| 3,744,638 | 7/1973 | Rhodes ..................... 210/924 |
| 4,052,306 | 10/1977 | Schwartz et al. ......... 210/924 |
| 4,065,923 | 1/1978 | Preus ........................ 210/924 |
| 4,133,088 | 1/1979 | Hikobe et al. ............ 210/924 |
| 4,165,282 | 8/1979 | Bennett et al. ........... 210/924 |
| 4,234,420 | 11/1980 | Turbeville ................. 210/924 |
| 4,377,478 | 3/1983 | Rolls et al. ............... 210/924 |
| 4,395,336 | 7/1983 | Eng .......................... 210/693 |
| 4,416,782 | 11/1983 | Kerres ...................... 210/693 |
| 4,737,394 | 4/1988 | Zafiroglu .................. 210/924 |
| 4,859,348 | 8/1989 | Jusaitis et al. ............ 210/799 |
| 4,965,129 | 10/1990 | Bair et al. ................. 210/924 |
| 5,002,814 | 3/1991 | Knack et al. ............. 210/242.4 |
| 5,084,171 | 1/1992 | Murphy et al. ........... 210/924 |

Primary Examiner—Robert A. Dawson
Assistant Examiner—Sun Uk Kim
Attorney, Agent, or Firm—Wood, Phillips, VanSanten, Hoffman & Ertel

[57] ABSTRACT

A method of recovering oil-based fluid from a surface that includes the steps of applying man-made fibers that absorb the oil-based fluid or a cloth made from the man-made fibers to the oil-based fluid on the surface, feeding the fibers or cloth having absorbed oil-based fluid to a device for applying force to the fibers or cloth to recover oil-based fluid and applying force to the fibers or cloth to recover oil-based fluid therefrom. The oil-based fluid recovered from the fibers and cloth can be put to a beneficial use. The fibers and cloth can be reused repeatedly. An apparatus capable of performing the method has rollers to apply the force to the fibers or cloth to recover oil-based fluid from the fibers or cloth.

23 Claims, 6 Drawing Sheets

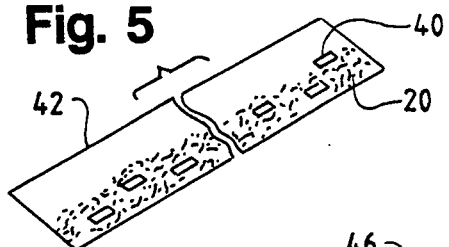
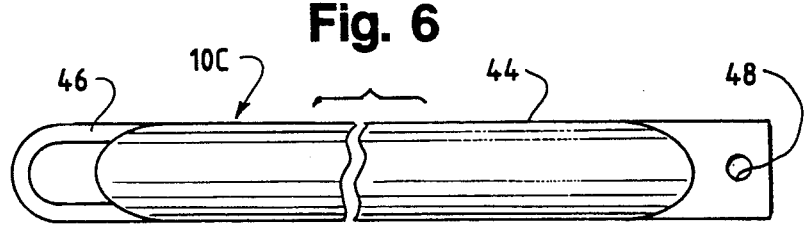
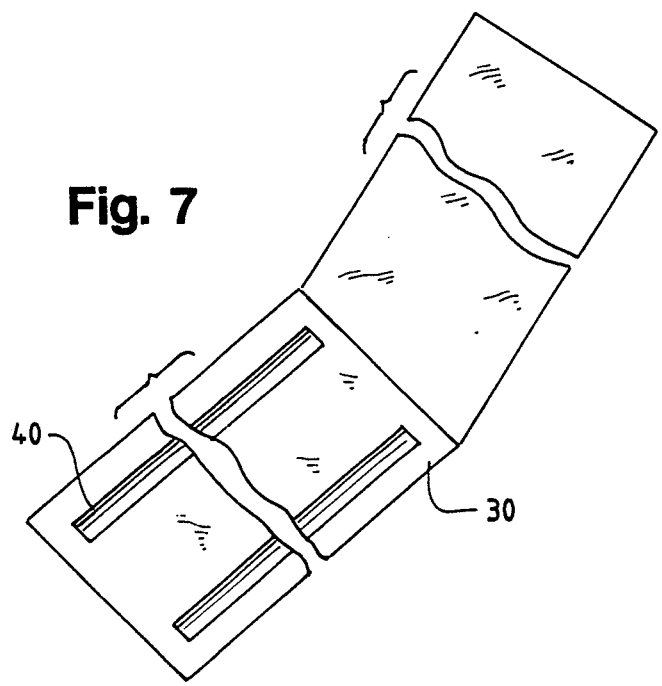
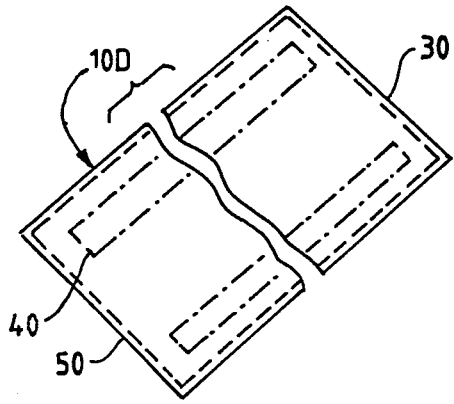
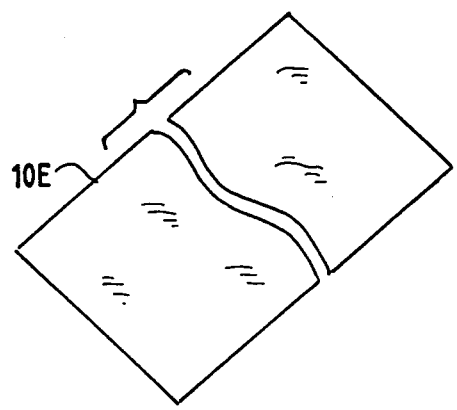

METHOD OF RECOVERING OIL-BASED FLUID AND APPARATUS

CROSS-REFERENCE TO RELATED APPLICATION

This is a continuation-in-part of U.S. Ser. No. 07/700,493 entitled "Method Of Recovering Oil-Based Fluid and Oil-Based Fluid Absorbent Article" that was filed on May 15, 1991.

TECHNICAL FIELD

The present invention relates to a method for recovering spilt oil-based fluid and an apparatus that performs the method. In particular, the present invention relates to a method that includes the step of feeding man-made fibers capable of absorbing oil-based fluid to rollers using a ramp and also relates to an apparatus for carrying out the method.

BACKGROUND OF THE INVENTION

Oil-based fluid spills pose environmental and health hazards and therefore are very troublesome whether they occur on a body of water or on a floor. Oil-based fluids include crude oil, fuel oil and the like. Many methods, articles and apparatuses are known to pick up oil-based fluid spills. Unfortunately, they have shortcomings.

Often the first step in picking up an oil-based fluid spill is containment to inhibit or prevent the oil-based fluid spill from spreading. Containment booms are positioned around the oil-based fluid spill to try to contain the spill. When the spill occurs on water, the containment boom typically has a flotation element that floats on top of the water and extends above the oil-based fluid and a downwardly extending skirt that extends below the oil-based fluid and into the water. The flotation element can be made of Kapok, styrofoam, styrofoam coated with polyurethane and the like. The skirt can be made of rubberized canvas or other material that is oil-based fluid impermeable. The material of the skirt can cover the flotation element.

Unfortunately, the action of the water due to the waves or the current can force the oil-based fluid over the flotation element. Also, the action can cause the skirt to sway towards and away from the oil-based fluid spill. When the skirt sways away from the oil-based fluid spill the skirt can pull the oil-based fluid underneath the skirt and hence outside of the containment boom.

The flotation element is designed to have little or no capability to absorb oil-based fluid or water. If the flotation element did absorb oil-based fluid or water this would result in an increase in the weight of the containment boom which would then ride lower in the spill and more readily permit oil-based fluid to be forced thereover. Once the oil-based fluid is outside of the containment boom the containment boom is useless.

After the spill has been cleaned up, the containment boom must either be cleaned, which is a time consuming and expensive process, or disposed of as by burning or burial in a landfill. These possible options are undesirable as they create environmental and health hazards. Also, the boom can only be reused a relatively few number of times, e.g., less than about five times. Furthermore, the oil-based fluid coating the containment boom is not recovered for subsequent use and therefore becomes an environmental and health hazard.

For large oil-based fluid spills on water, skimmers are employed after the containment booms have been positioned. The skimmers pick up the oil-based fluid but also pick up relatively large amounts of water that contaminate the oil-based fluid to create a water and oil-based fluid mixture. If it is desired to use the oil-based fluid rather than waste it by disposing of it, the water contamination must be removed as by heating the which is a time consuming and expensive process. Alternatively, the water and oil-based fluid mixture can be disposed of which creates environmental and health hazards. Furthermore, the presence of the water in the mixture increases the volume of the material to be disposed of which increases the economic and environmental cost.

When the spill occurs on a solid surface, oil-based fluid absorbent clays can be utilized to contain and/or pick up the spill. The oil-based fluid absorbent clays can be packed in an oil-based fluid permeable cloth to make handling easier. Unfortunately, the oil-based fluid cannot be recovered from the clay and the clay containing oil-based fluid must be disposed of with the attendant problems.

The spill can be picked up using wipes. The use of wipes is especially advantageous for small spills on a solid surface and for oil-based fluid that has washed ashore. Unfortunately, these wipes have relatively poor absorption characteristics and absorb relatively little oil-based fluid for their own weight. Often, these wipes are only utilized once and then must be disposed of with the attendant disposal problems. Some wipes appear to be made of non-woven wood fibers.

As disclosed in U.S. Pat. No. 3,744,638 to Rhodes it is known to use an oil mop made of strips of polypropylene extending from a rope to pick up oil. Unfortunately, the rope does not contribute to the absorption of oil or the flotation of the mop. Therefore, the rope requires extra work be utilized to dispense and recover the rope even though the rope does not contribute to oil absorption or flotation of the mop. Furthermore, the mop of the Rhodes patent can have oil which is released from the mop back onto the surface as the rope is pulled onto the barge. The release of oil lowers the efficiency of the mop.

U.S. Pat. No. 3,739,913 to Bogosian discloses a device that includes a container that does not absorb oil. Therefore, the container does not contribute to the absorption of oil or to the flotation of the device.

A method of recovering oil-based fluid so that the oil-based fluid can be recovered and used and an apparatus for performing the method that overcome at least some of the shortcomings of the prior art are desirable.

SUMMARY OF THE INVENTION

The present invention is directed to a method of recovering oil-based fluid from a surface that has oil-based fluid thereon. The method includes the steps of feeding man-made fibers having absorbed oil-based fluid to rollers for applying a force to the fibers and forcing absorbed oil-based fluid therefrom to recover oil-based fluid. The feeding step of the method preferably includes the step of minimizing release of oil-based fluid from the fibers prior to applying the force as by pulling the fibers up an incline ramp. The method can also include the step of collecting released oil-based fluid from the ramp to recover the released oil-based fluid.

The present invention is also directed to an apparatus for performing the method. The apparatus has rollers for applying the force to the fibers having absorbed oil-based fluid to recover the oil-based fluid therefrom and can also include an incline ramp for minimizing release of oil-based fluid from the fibers prior to recovery of the oil-based fluid. The apparatus can also include a collector associated with the incline ramp for collecting fluid released from the fibers. The ramp also is used for guiding the fibers to the rollers.

The man-made fibers can be formed into an oil-based fluid absorbent article. The article can be made by placing the fibers in an oil-based fluid permeable container either alone or with a flotation material for supporting the flotation of the fibers at a surface such as water. Alternatively, the article can be made by forming the fibers into an oil-based fluid absorbent cloth that can be a sheet-form cloth. In further alternatives of the article, the cloth can be folded about flotation material so that the floatation material is contained within the interior of the article, the cloth can be folded about flotation material and the fibers so that the flotation material and fibers are contained within the cloth, the cloth can be folded about the flotation material and shredded pieces of cloth so that the flotation material and the shredded pieces of cloth are contained within the interior of the article or pieces of the cloth can be placed in the oil-based fluid permeable container with or without the fibers and the flotation material. Any of the above further alternatives can exclude the use of the flotation material.

The cloth preferably has at least one napped surface that defines voids therein to provide additional surface area for absorbing the oil-based fluid. The nap is presently believed to create a capillary action that draws the fluid into the cloth to increase the amount of oil-based fluid absorbed and the rate of absorption. When the nap is exposed to the spilt oil-based fluid, the oil-based fluid is drawn into the cloth and the interior of the article. If fibers or cloth are present in the interior, oil-based fluid can be absorbed by the interior fibers or cloth from the cloth. Thus, the cloth is oil-based fluid permeable when the article has interior fibers or cloth because the interior fibers or cloth absorb oil-based fluid from the cloth exposed to the spilt oil-based fluid on the surface.

The fibers and cloth absorb many times their own weight in oil-based fluid which permits a relatively small amount of fibers or cloth to absorb a relatively large amount of oil-based fluid. This reduces the weight of the fibers or cloth that must be transported to the spill site which reduces transportation costs. After the oil-based fluid is recovered from the fibers or cloth the fibers or cloth can be reused and the cycle of absorbing the oil-based fluid with the fibers or cloth and recovering oil-based fluid therefrom can be repeated many times. This reusability is very beneficial as it minimizes the amount of fibers or cloth that needs to be utilized which in turn reduces the quantity of fibers and cloth that are needed at the spill.

The fibers and cloth are highly oleophilic. Therefore, when the surface is a water surface, e.g., an ocean, lake, stream or the like, the fibers or cloth will absorb the oil-based fluid and very little, if any, water. Thus, the oil-based fluid recovered from the fibers or cloth will have at most only very little water which can be evaporated away by applying heat. It is presently believed that when the cloth has a nap exposed to the oil-based fluid, which is hydrophobic, the oil-based fluid is drawn into the nap to reduce the water absorption of the cloth even further.

The recovered oil-based fluid can be utilized as if it had not been spilt. Thus, the oil-based fluid is an asset as it has commercial value as opposed to an environmental liability which occurs when many conventional methods of cleaning up oil-based fluid spills, especially spills on water.

The method and article are especially useful for recovering oil-based fluid spilled on water surfaces. Absorbent containment booms of the absorbent fibers or cloth can be positioned around an oil-based fluid spill. As the absorbent containment boom will absorb oil-based fluids due to the presence of the absorbent fibers or cloth, oil-based fluid that comes in contact therewith can be absorbed as opposed to conventional booms that do not absorb oil-based fluids. Thus, if oil-based fluid is forced past the absorbent containment boom, the oil-based fluid can be absorbed if it remains in contact with the absorbent containment boom. This is in sharp contrast to a conventional boom that does not absorb oil-based fluid and has no effect on the oil-based fluid once the oil-based fluid is forced past the conventional containment boom. Also, the absorbent containment boom can be removed, the oil-based fluid absorbed therein recovered, and the boom reused numerous times. Conventional containment booms are typically discarded after at most a few uses resulting in the creation of environmental and health hazards.

Preferably, the present method and apparatus are utilized with an article having an oil-based fluid permeable container, e.g., the cloth, that also absorbs the oil-based fluid and contributes to the recovery of the oil-based fluid. The cloth can be produced to have sufficient structural integrity so that the use of an external strengthener, such as a netting or rope, that does not contribute to the flotation of the article or recovery of the oil-based fluid can be eliminated. Thus, the article can be self-supporting and the entire article can be used for absorption or flotation.

Numerous other advantages and features of the present invention will become readily apparent from the following detailed description of the invention, the figures and the appended claims.

BRIEF DESCRIPTION OF THE DRAWINGS

FIG. 5 illustrates components of an article including some fibers and optional flotation material on a container material;

FIG. 6 illustrates the article made using a container;

FIG. 7 illustrates components of an alternative article including flotation material on absorbent cloth;

FIG. 8 illustrates the alternative article made of the components of FIG. 7;

FIG. 9 illustrates an alternative embodiment of the article that does not have flotation material;

DETAILED DESCRIPTION OF THE PREFERRED EMBODIMENT

Although this invention is susceptible to embodiment in many different forms, preferred embodiments of the invention are shown. It should be understood, however, that the present disclosure is to be considered as an exemplification of the principles of this invention and is not intended to limit the invention to the embodiments illustrated.

Figure 1:
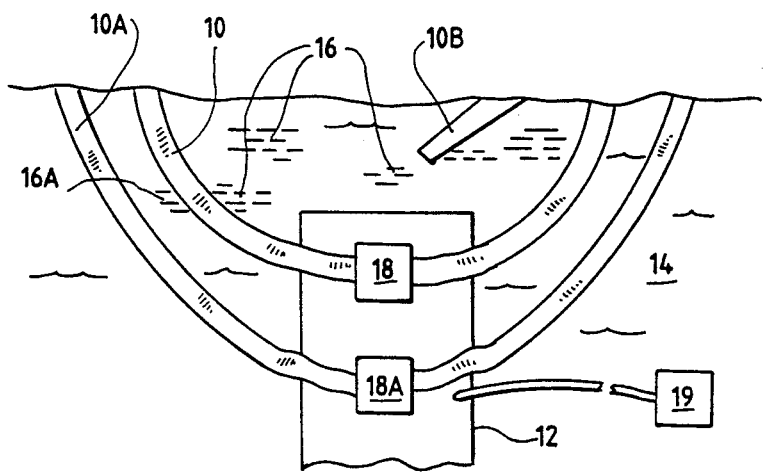
FIG. 1 is a top elevational view of oil-based fluid absorbent articles of the present invention being utilized to contain and recover oil-based fluid spilt upon water.

FIG. 1 illustrates a representative environment in which a first oil-based fluid absorbent article 10 suitable for use in the present invention can be utilized. The article 10 is shown being utilized as a containment boom and extends from a platform 12 that can be a barge, pier or the like into the water 14 and encircles oil-based fluid 16 that is floating on the surface of the water 14. Alternatively, the platform can be a trailer that remains on the land with the oil-based fluid absorbent article extending therefrom. This alternative is not illustrated. A second oil-based fluid absorbent article 10A is deployed as a containment boom to contain oil-based fluid 16A that may be forced past the first oil-based fluid absorbent article 10 as by the action of the waves or current. The first oil-based fluid absorbent article 10 can absorb this oil-based fluid 16A if contact between the first oil-based fluid absorbent article 10 and the oil-based fluid 16A is maintained. The second oil-based fluid absorbent article 10A is positioned to contain and/or absorb the oil-based fluid 16A that is not contained or absorbed by the first oil-based fluid absorbent article 10.

Recovery apparatuses 18 and 18A can be utilized to recover oil-based fluid absorbed by the absorbent articles 10 and 10A, respectively. The apparatuses 18 and 18A are carried on the platform 12 and can retrieve the absorbent articles 10 and 10A from the water 14 onto the platform 12, recover the oil-based fluid therefrom by compression and dispense the absorbent articles 10 and 10A back on top of the water 14. The recovered oil-based fluid (not shown) can be stored on the platform 12, pumped into a tanker or on-shore facility or other remote facility 19 for transporting or holding the recovered oil-based fluid.

The term "recover" as used in its various grammatical forms in conjunction with the oil-based fluid absorbed by the fiber or cloth, means that the absorbed oil-based fluid can be taken from the fiber or cloth and beneficially used.

To further facilitate recovery of the oil-based fluid a number of absorbent articles as represented by oil-based fluid absorbent article 10B, can be positioned within the oil-based fluid 16 to absorb the same. Absorbent articles 10B can be utilized to recover the bulk of the oil-based fluid 16 thereby permitting the first absorbent article 10 to function more as a containment boom. Recovery of the oil-based fluid from the absorbent article 10B can be accomplished utilizing a recovery apparatus (not shown) that can be on the platform 12 or on a second platform (not shown).

Figure 2:
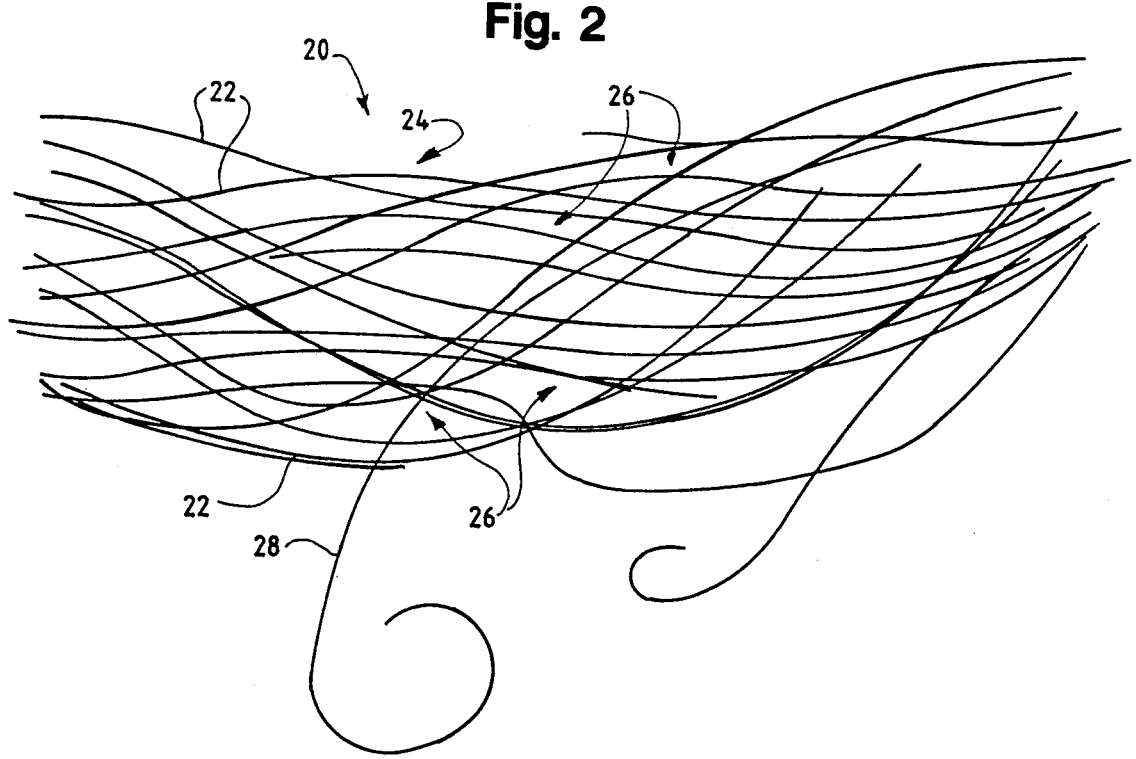
FIG. 2 is a magnified view of a fiber showing individual filaments.

FIG. 2 illustrates a magnified fiber 20 made up of numerous filaments 22. A twist 24 of the filaments 22 can be present to assist in maintaining the integrity of the fiber 20. Interstices 26 can be defined by filaments 22 that are adjacent to each other. It is presently believed that oil-based fluid (not shown) can be contained within the interstices 26 as well as between adjacent fibers (not shown). The filaments 22 can have smooth surfaces 28 along their length.

Figure 3:
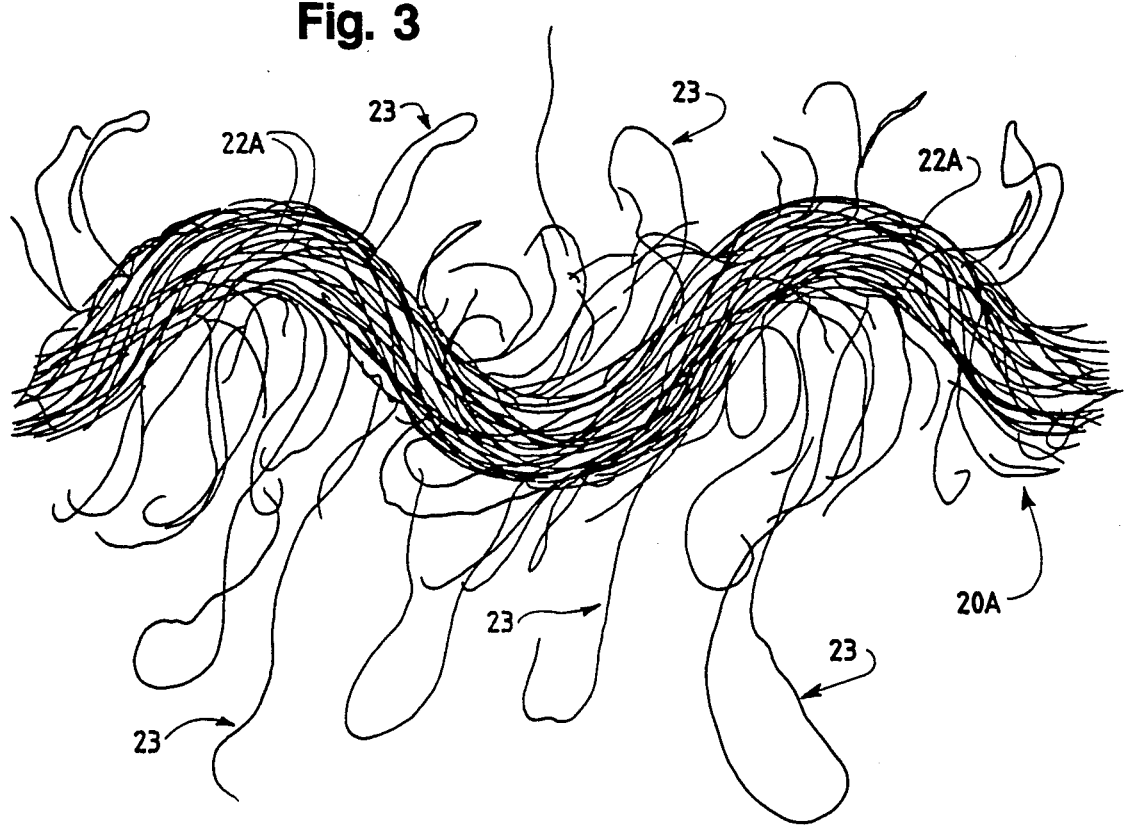
FIG. 3 is a magnified view of a fiber of an oil-based fluid absorbent cloth that has been napped.

FIG. 3 illustrates a magnified fiber 20A made up of numerous filaments 22A. This fiber 20A had been woven into a cloth (not shown) having two surfaces that are napped. The fiber 20A was removed from the cloth. Filaments 22A have sections 23 thereof that have been pulled from the fiber 20A during the napping process. These filaments 22A form part of the nap of the cloth.

Figure 4:
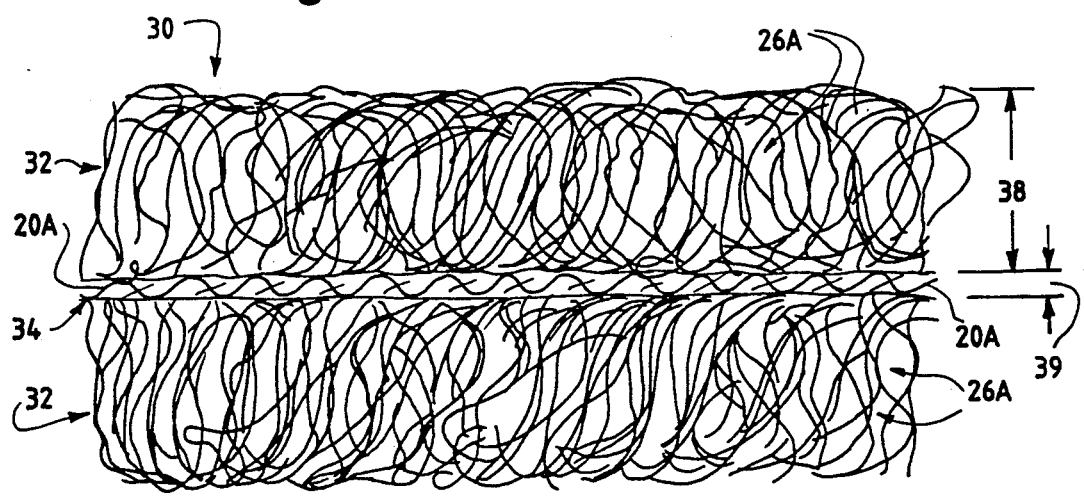
FIG. 4 is an enlarged illustration of a cross-section of a preferred absorbent cloth showing the nap.

FIG. 4 illustrates an enlarged cross-section of an oil-based fluid absorbent cloth 30 taken along the thickness thereof. Naps 32 have a relatively thin dense layer 34 therebetween. Within the nap 32 are defined voids 26A that are presently believed to enhance the absorption of oil-based fluid (not shown) by the cloth 30. The thickness 38 of the nap 32 can effect the amount of oil-based fluid absorbed by the cloth 30. The individual fibers 20A can be seen in the dense layer 34 which has a thickness 39.

FIG. 5 illustrates components that can be made into an absorbent article. The components include fibers 20 and optional flotation material 40 that are positioned on sheet form container material 42. Additional fibers and flotation material which are not shown can be present. In alternative embodiments that are not illustrated, cloth, in the form of large or small pieces, replaces the fibers or is used in conjunction with the fibers. In a further alternative embodiments that are not illustrated the floatation material is not utilized.

FIG. 6 illustrates an alternative embodiment of the absorbent article 10C having fibers (not shown) and/or cloth (not shown) held within container 44. Optionally, flotation material (not shown) can also be held within the container 44. The absorbent article 10C can also have a securement loop 46, securement grommet 48 or the like for securing the absorbent article 10C onto objects such as other absorbent articles (not shown), platforms (not shown) buoys (not shown) and the like.

FIG. 7 illustrates the components of an absorbent article prior to assembly into the absorbent article 10D of FIG. 8. Sheet-form oil-based fluid absorbent cloth 30 is provided in the desired size and shape. The flotation material 40 in the desired size and amount is placed on a surface of the cloth 30. The cloth 30 is then folded on top of the flotation material 40 and the edges of the cloth 30 are secured as by thread 50 to produce the absorbent article 10D.

Alternatively, as illustrated in FIG. 9, an absorbent article 10E can be made of the cloth 30 alone. Such an absorbent article 10E is especially useful for recovering a relatively small amount of oil-based fluid that is on a solid surface.

Figure 10:
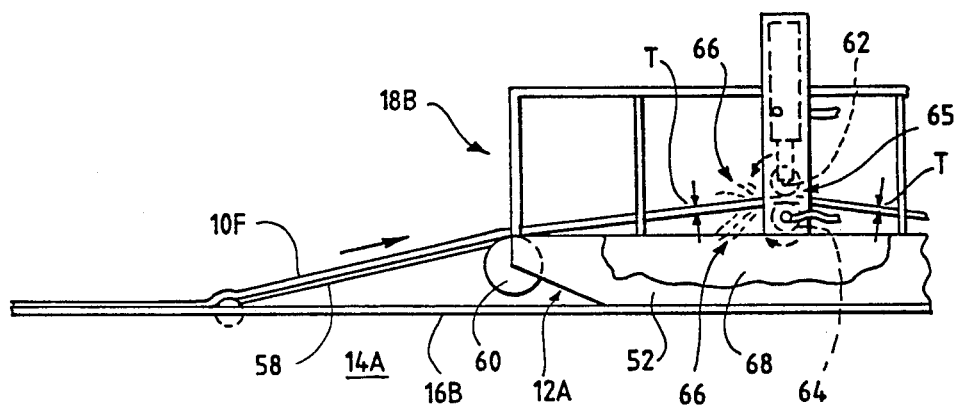
FIG. 10 is a side view of the present apparatus for recovering oil-based fluid from a surface.

FIG. 10 illustrates an apparatus 18B for recovering oil-based fluid 16B that is on the water 14A using oil-based fluid absorbent article 10F. The apparatus 18B is on a floating platform 12A that includes pontoons 52. The article 10F is pulled up an incline ramp 58 over a first transition roller 60 by the cooperation of a vertically adjustable roller 62 and a vertically fixed roller 64. One or both of the adjustable roller 62 and the fixed roller 64 can be driven to cause rotation in opposite directions. As shown in FIG. 10, the vertically adjustable roller 62 rotates in a counter clockwise direction and the vertically fixed roller 64 rotates in a clockwise direction. An adjustable gap 65 is between the adjustable roller 62 and the fixed roller 64 that is smaller than the thickness T of the article 10F. Because the gap 65 is thinner than the thickness T a force is applied to the article 10F to squeeze recovered oil-based fluid 66 therefrom. The recovered oil-based fluid falls into a tank 68. The article 10F having the absorbed oil-based fluid removed therefrom returns to substantiate its initial thickness T after passing through the adjustable roller 62 and fixed roller 64.

Figure 11:
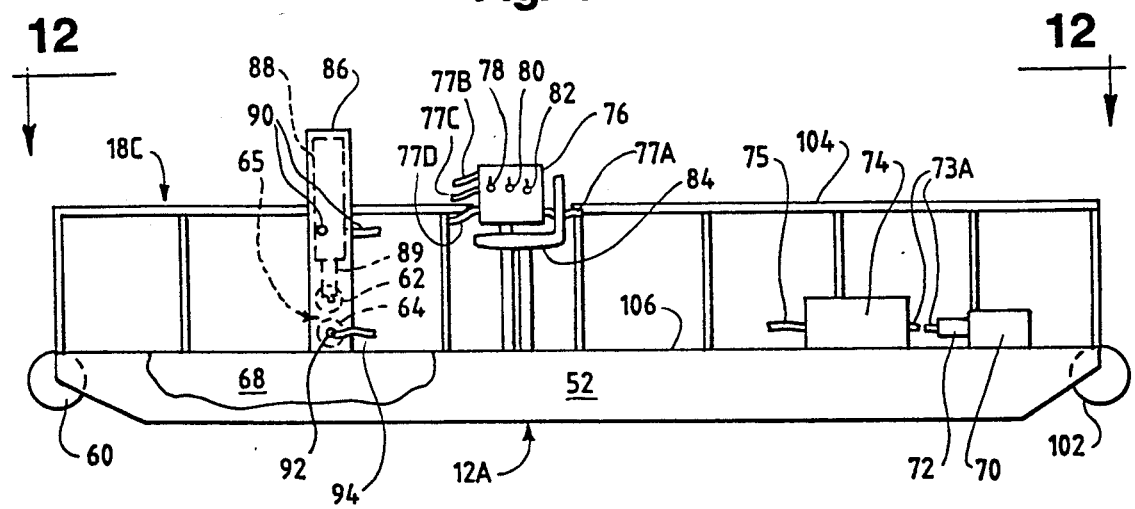
FIG. 11 is a side view of the apparatus.
Figure 12:
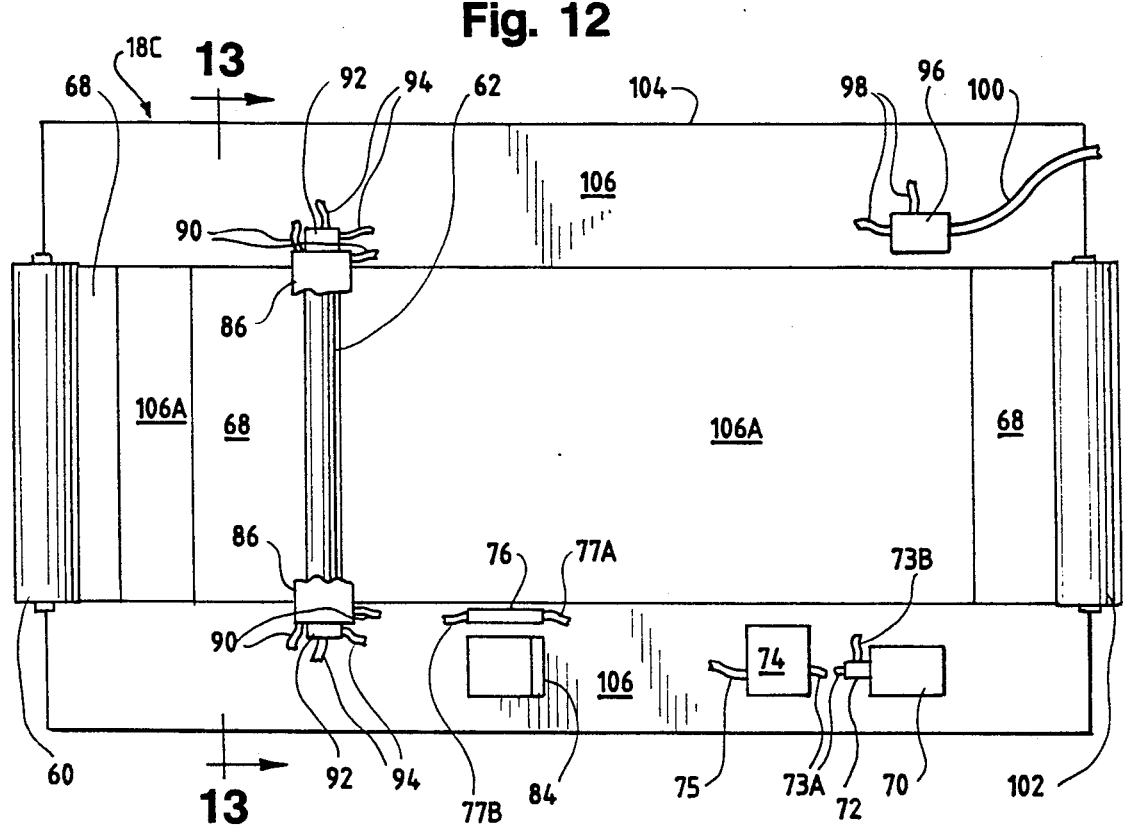
FIG. 12 is a top view of the apparatus.

FIGS. 11 and 12 illustrate the apparatus 18C on the platform 12A that includes pontoons 52. The apparatus 18C includes an internal combustion engine 70 that drives a hydraulic pump 72 that powers the operation of hydraulic equipment such as the motors, cylinders and pumps discussed hereinafter. The use of a hydraulic system to power the equipment is preferred because it minimizes the possibility of creating an electrical spark which can ignite fumes from the oil-based fluid. The engine 70 can be explosion proof or it can be located in a place that is remote from the oil-based fluid. Hydraulic lines 73A and 73B are the feed and discharge lines, respectively, of the pump 72. For the sake of clarity, the sections of the hydraulic lines extending between the equipment are not shown, it being understood that the hydraulic lines are run in a conventional manner. Hydraulic fluid is fed from a hydraulic fluid tank 74 through hydraulic feed line 73A to the pump 72. A return hydraulic line 75 is used to return hydraulic fluid to the hydraulic fluid tank 74 from the equipment. The pump 72 provides hydraulic fluid under pressure to a control box 76 through feed hydraulic line 77A and 77B. The control box 76 provides controls for the operation of the hydraulic equipment utilized. Three controls are shown on the control box 76 although more or fewer controls can be present depending upon the equipment utilized. The control box can include a hydraulic cylinder control 78, a hydraulic motor control 80, and a recovered oil-based fluid pump control 82 that are in fluid communication with the feed hydraulic line 77A. Each of the hydraulic cylinder control 78, the hydraulic motor control 80 and the recovered oil-based fluid pump control 82 have a discharge hydraulic line 77B, 77C and 77D, respectively. An operator (not shown) can be seated in seat 84 while operating the apparatus 18C. A housing 86 houses two hydraulic cylinders 88 (only one of which is shown), two pistons 89 (only one of which is shown) extending from the cylinders 88, the adjustable roller 62 and fixed roller 64. The hydraulic cylinders 88 are in fluid communication with the cylinder control 78 and the hydraulic fluid tank 74 through hydraulic lines 77B, 90 and 75. The adjustable roller 62 is attached at each end to one end of one of the pistons 89 that moves within its cylinder 88 to adjust the position of the adjustable roller 62 and hence the size of the adjustable gap 65 in response to the hydraulic cylinder control 78. The hydraulic motors 92 are in fluid communication with the hydraulic motor control 80 and the hydraulic fluid tank 74 through hydraulic lines 77C, 94 and 75. The hydraulic motor 92 can drive the vertically fixed roller 64 in a clockwise or counterclockwise direction depending upon the direction in which the article is being run through the apparatus 18C and at various speeds in response to the hydraulic motor control 80. The vertically adjustable roller 62 can be free spinning so that rotation is caused by the article being moved by the fixed roller 64. Alternatively, the adjustable roller 62 can also be driven by hydraulic motors (not shown). Recovered oil within the tank 68 can be removed therefrom using a hydraulic recovered oil-based fluid pump 96 that is in fluid communication with the recovered oil-based fluid pump control 82 and the hydraulic fluid tank 74 through hydraulic lines 77D, 98 and 75. The recovered oil-based fluid pump 96 is in fluid communication with recovered oil-based fluid within the tank 68 and discharges the pumped oil-based fluid through outlet line 100 to a remote facility (19 of FIG. 1). The pump 96 is controlled by the recovered oil-based fluid pump control 82. A second transition roller 102 can be present at an end of the apparatus 18C opposed from the end having the first transition roller 60. The transition rollers 60 and 102 provide a transition between the surface and the apparatus 18C. Preferably, the transition rollers 60 and 102 freely rotate about an axis so that the passing of the article over the transition rollers 60 and 102 causes rotation thereof. Alternatively, one or both of the transition rollers 60 and 102 can be driven to cause rotation. This alternative embodiment is not illustrated. The platform 12A and apparatus 18C also include railing 104 that extends partially or completely around the perimeter thereof for safety purposes, especially when on water. Decking 106 extends over the pontoons 52 to support the equipment. Decking 106A can extend over the tank 68 so that the article can pass over the tank 68 and recovered oil-based fluid can pass into the tank 68. The decking 106 and 106A can be solid or perforated.

The apparatus 10C can also include sensors to determine the speed of the various rollers and pumps and the level of oil-based fluid within the tank 68 and a propulsion motor. Gauges to indicate the status of the equipment can be present on the control box. These alternatives are not illustrated.

Figure 13:
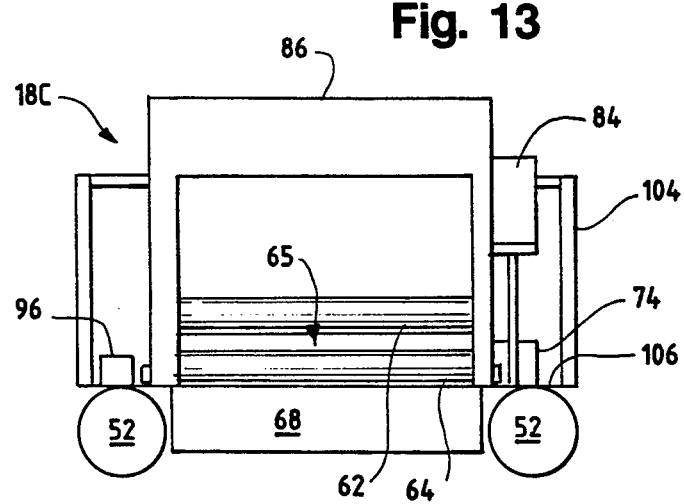
FIG. 13 is an end view of the apparatus.

FIG. 13 illustrates an end view of the apparatus 18C. The pontoons 52 support decking 106 and have the tank 68 therebetween. On the decking 106 is the hydraulic fluid tank 74, the seat 84, the housing 86, the recovered oil-based fluid pump 96 and the railing 104. The adjustable roller 62 and fixed roller 64 have the adjustable gap 65 therebetween.

Figure 14:
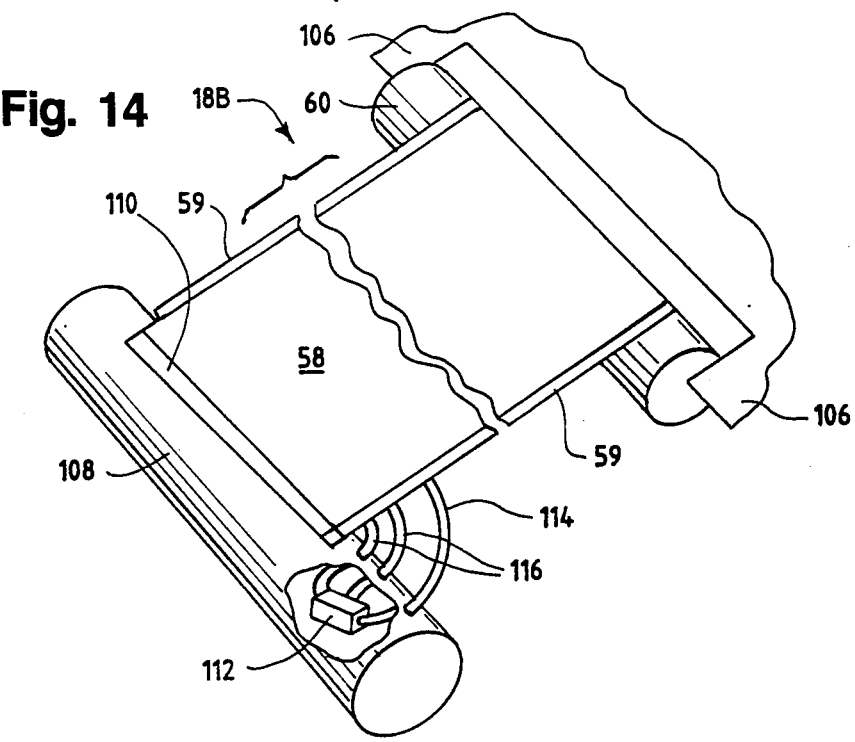
FIG. 14 is a side elevational view of the ramp of the apparatus.

FIG. 14 illustrates a partial view of the apparatus 18B including a collector 108 positioned at the bottom of the inclined ramp 58. The collector 108 has a slot 110 with which the ramp 58 is in fluid communication and a released oil-based fluid pump 112. The ramp 58 can be positioned over the first transition roller 60 or, in an alternative embodiment that is not illustrated, under the first transition roller 60. The ramp 58 has an upwardly turned lip 59 extending along its length to help guide the article and maintain it on the ramp 58. The lip 59 also helps to maintain oil-based fluid released from the article on the ramp 58. The released oil-based fluid flows down the ramp 58 through the slot 110 into the collector 108. Absorbed oil-based fluid can be released from the article as the article is being removed from the surface to the rollers of the apparatus. The slope of the ramp 58 can be adjusted to minimize or maximize the amount of oil-based fluid that is released for a given speed at which the article travels. The collector 108 can be affixed to the ramp 58 with at least the slot 110 remaining above the spilt oil-based fluid even when the collector 108 contains released oil-based fluid. The pump 112 is operably associated with a released oil-based fluid pump control (not shown) on the control box (not shown) and the hydraulic fluid tank (not shown) through the hydraulic lines 116. The pump 112 has an outlet line 114 through which released oil-based fluid is pumped into the tank (not shown) and thereby becomes recovered oil-based fluid. The outlet line 114 and the hydraulic lines 116 can run under the ramp 58.

Figure 15:
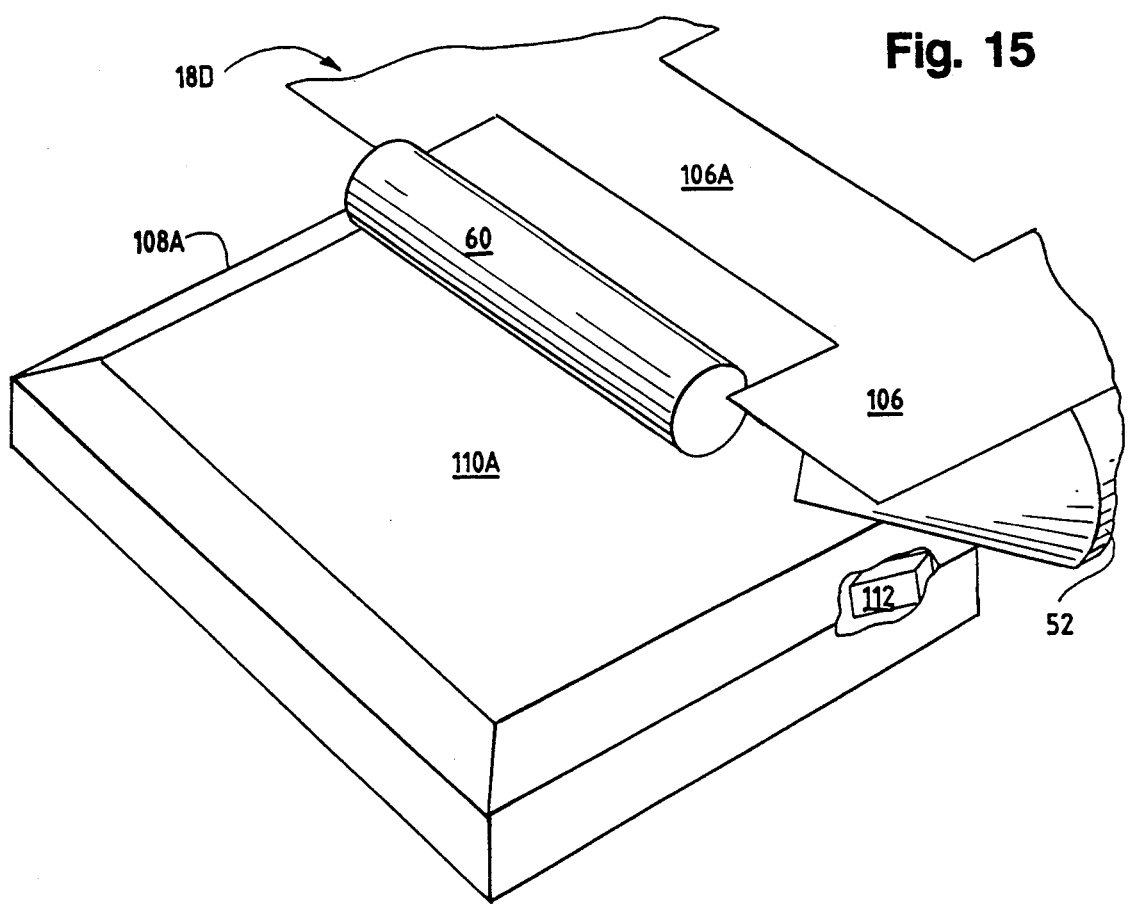
FIG. 15 is a side elevational view of a widened collector of the apparatus.

FIG. 15 illustrates a partial view of the apparatus 18D including a widened collector 108A positioned to collect oil-based fluid released from the article (not shown) as it is fed to the apparatus 18D. The collector 108A has a widened slot 110A through which the released oil-based fluid enters the collector 108A. The pump 112 operates as described above.

When the apparatus includes the ramp and the collector, the article is pulled from the spilt oil-based fluid over the collector, up the ramp, over the first transition roller and through the adjustable gap. When the apparatus includes the widened collector, the article is pulled from the spilt oil-based fluid over the collector, over the first transition roller and through the adjustable gap. The engine is started which causes the pump to pump hydraulic fluid. The hydraulic cylinder control is used to lower the vertically adjusted roller so that the adjustable gap is sized so the adjustable roller and the fixed roller apply a force to the article as it passes therethrough to recover oil-based fluid therefrom. The hydraulic motor is activated by the hydraulic motor control. Preferably, the gap and the speed of the fixed roller are set to enable recovery of most of the absorbed oil-based fluid from the article into the tank. Rotation of the fixed roller causes the article to be pulled in the direction of the rotation of the top of the fixed roller which in turn causes the adjustable roller to rotate in a direction opposite that of the fixed roller. The article having the absorbed oil-based fluid recovered therefrom passes over the second transition roller and back onto the surface having spilt oil-based fluid thereon. The recovered oil-based fluid in the tank can be removed therefrom using the recovered oil-based fluid pump that is controlled by the recovered oil-based fluid pump control. The recovered oil is thereby transferred to a facility remote from the apparatus and the platform. When the ramp and the collector are utilized or the widened collector is utilized alone, oil-based fluid released from the article flows down the ramp and into the collector to minimize the loss of released fluid that occurs when the article is pulled out of the spilt oil-based fluid and up to the adjustable roller and the fixed roller. The released oil-based fluid that collects in the collector can be removed therefrom using the released oil-based fluid pump that is controlled by the released oil-based pump control. Alternatively, the ramp and collector are not utilized. The article can be pulled through the apparatus in a direction that is opposite to the above direction by pulling the article up over the second transition roller, through the gap and then over the first transition roller back onto the spilt oil-based fluid.

The method of the present invention includes the steps of applying the fibers or cloth to oil-based fluid that is on a surface. The fiber or cloth is maintained in contact with the oil-based fluid to absorb oil-based fluid and can then be removed from contact with the oil-based fluid on the surface. Absorbed oil-based fluid is temporarily held by the fiber or cloth until the absorbed oil-based fluid is recovered. The method also includes the step of recovering a significant portion of the absorbed oil-based fluid from the fiber or cloth. Recovery can be accomplished by feeding the fiber or cloth having absorbed oil-based fluid to a device such as rollers for applying force to the fiber or cloth and forcing, as by squeezing, the oil-based fluid from the fiber or cloth containing the same using the rollers. The step of feeding preferably includes minimizing the release of the oil-based fluid released from the fiber or cloth during the feeding step as by using a ramp. Alternatively, the feeding step can include the step of collecting the oil-based fluid released from the fiber or cloth during the feeding step. The method can also include the step of reapplying the fiber or cloth having oil-based fluid recovered therefrom to the oil-based fluid on the surface. The steps of applying the fiber or cloth to the oil-based fluid, retrieving the fiber or cloth from the surface, recovering absorbed oil-based fluid and reapplying the fiber or cloth to the surface can be repeated.

The term "significant", and various grammatical forms thereof, when used to define the amount of absorbed oil-based fluid recovered from the fiber or cloth, means that most of the oil-based fluid absorbed by the fiber or cloth can be recovered by selection of the proper force applied to the fiber or cloth.

The method can also be performed utilizing an absorbent article that includes: fiber and a flotation material; cloth and a flotation material; or fiber or cloth in an oil-based fluid permeable container. The flotation material is present in an amount effective to assist or provide flotation of the oil-based fluid after the fiber or cloth has absorbed oil-based fluid.

The fibers and cloth made from the fibers are highly absorbent of oil-based fluid. Also, in an environment having both oil-based fluid and water, the fibers will absorb mostly oil-based fluid and will absorb little or no water. These features of absorbing many times their weight in oil-based fluid and absorbing mostly oil-based fluid in an environment having both oil-based fluid and water are presently believed to be due to the oleophilic nature of the fiber and hence of the cloth.

The fiber suitable for use in this invention is made of a number of individual filaments that can be twisted together to form the fiber. The length of the filaments are such that the filaments can be staple or continuous filaments. The number of filaments in the fiber and the denier of the fiber are selected to achieve the desired results.

The term "staple", as used herein in its various grammatical forms in connection with the length of the filaments, defines a length of the filaments that is relatively short and typically a length of about 20 inches or less.

The term "continuous", as used herein in its various grammatical forms in connection with the length of the filament, defines a length that is greater than about 20 inches.

The term "denier", as used herein in its various grammatical forms, indicates the thickness of the fiber with a lower number representing a finer fiber and a higher number representing a courser fiber.

Representative of suitable fibers are those made of polyester, nylon, the like and mixtures thereof. A preferred fiber is a polyester fiber such as the polyester fiber Dacron ® polyester which is commercially available from DuPont, Inc., Wilmington, Del.

Although fibers of 1.5 denier and a length of 1.5 inches can be utilized, fibers having at least about 50 denier, more preferably about 60 denier and having at least about 25, preferably at least about 30, filaments per fiber perform better when the fiber is not made into a cloth.

The fibers can be made into a yarn that is made into a cloth that can have at least one surface thereof napped by a conventional process. Preferably, the yarn is a spun yarn that is produced from a number of staple fibers. Preferably, the fibers are spun to give the yarn a slack twist. The use of staple fibers and a slack twist is presently believed to result in the yarn having a large number of fiber ends and loops, respectively, at the surface of the yarn. These fiber ends and loops are available to be raised and entangled during the napping process.

The yarn is then made into the cloth preferably by knitting. The knitting stitch can be selected to provide the desired degree of elasticity in the cloth, to provide the desired structural integrity after napping and permit the desired thickness of the nap to be obtained. One method of knitting the cloth is to knit the yarn to produce a tubular form which is then split open and at least one surface thereof is napped. A suitable stitch is a plain jersey knit.

Preferably, both surfaces of the cloth are napped. Napping can be achieved by brushing the surface of the cloth to raise the ends or loops of the fiber of the yarn. Napping increases the thickness of the cloth and creates voids in the cloth which are presently believed to assist in holding the oil-based fluid. Napping also increases the surface area of the cloth which is presently believed to increase the amount of oil-based fluid that can be absorbed as compared to a cloth lacking a nap.

After napping, the cloth has at least one nap and can have a relatively dense layer adjacent to the nap. When the cloth has two naps the dense layer is disposed between the naps.

Preferably, the cloth has a total nap thickness for two naps of up to about 1.5, preferably up to about 1, millimeters (mm). (See, FIG. 4, thickness 38.)

The dense layer is preferably up to about 0.2 mm thick. (See, FIG. 4, thickness 39.) The thickness of the dense layer is selected to provide the desired contribution to the structural integrity of the cloth and can be eliminated especially if the cloth is to be chopped up into small pieces and held within the container.

Preferably, the ratio of the thickness of the dense layer, when present, to the total thickness of the nap is in the range of about 1:5 to about 1:15.

A square foot of the cloth having two naps, a total nap thickness of about 1 mm for both naps and a dense layer thickness of about 0.1 mm, preferably has a weight in the range of about 30 to about 60, more preferably about 35 to 55 grams (g).

The fiber and cloth are capable of absorbing at least about 5 times, preferably about 8 times and more preferably about 12 times their own weight in oil-based fluid.

Representative of the fibers are: Dacron ® polyester, 70 denier/34 filament, continuous filament, semidull; DuPont nylon (filament), 400 denier, 68 filament, semidull; Antron ® nylon, 70 denier-34 filament, ½ Z twist, semidull; DuPont nylon (staple), 1½ denier, 1½ inch semidull; and Kevlar ® aramid, type 968, 1140 denier; and the like. The Dacron ® polyester, the DuPont nylon, the L Antron ®nylon and the Kevlar ®are commercially available from DuPont.

Commercially available cloths are those conventionally utilized for their thermal insulation capabilities. Representative of these cloths are styles 7660–7666 commercially available from Malden Mills, New York, N.Y. which is also available under the trade name Polar Cloth, thermal fabric style no. 19613 from Gilford Mills Inc., Greensboro, N.C. and the like. A preferred cloth is the style 7660-7666 from Malden. In excess of about 80, preferably about 90 percent of the oil-based fluid can be recovered from the Malden cloth upon application of the proper force.

The flotation material can be a cellular foam material and is preferably a flexible closed cell foam. The flotation material should exhibit minimal degradation due to exposure to the oil-based fluid and be capable of withstanding the repeated forces experienced in the recovery of the oil-based fluid from the fiber or cloth. These forces include those induced by squeezing, ringing or compressing. Also, the flotation material should maintain the ability to provide buoyancy for the fiber or cloth after exposure to oil-based fluid and repeated exposure to forces experienced in the recovery of the oil-based fluid. The flotation material preferably does not absorb oil or water as such absorbance can decrease the buoyancy of the flotation material. Some loss of buoyancy can be tolerated provided the fiber or cloth can be removed after absorbing oil-based fluid.

Representative flotation materials include polyethylene foams, polyester foams and the like. Two commercially available foams are the polyethylene foam commercially available from NMC, Inc., Zebulon, N.C. and charcoal polyester commercially available from Merriweather Foam, Inc., Barberton, Ohio. Presently, polyethylene foams are preferred.

The weight ratio of the fiber or cloth to the flotation material is dependent upon the anticipated weight of the fiber or cloth plus absorbed oil-based fluid, the amount of buoyancy provided by the flotation material, the density of the water, e.g., fresh water or salt water, upon which the oil-based fluid is floating the weight and density of the container (if present) and like factors. The weight ratio can be readily calculated based upon the above factors. The article can be made prior to the spilling of the oil-based fluid because great latitude in the weight ratio is possible.

Preferably, the weight ratio of the fiber or cloth to the flotation material is selected, and the article is designed, so that for an absorbent article used on water and having a circular cross-section about ⅓ of the article is above the oil-based fluid, about ⅓ of the article is in the oil-based fluid and about ⅓ of the article is below the surface of the water. When the Malden cloth and the polyethylene foam from NMC, Inc. are utilized. The weight ratio of the cloth to the flotation material is preferably in the range of about 1:1 to 3:1.

Absorbent articles can be made by placing the fiber or cloth and optional flotation material in a container. The container is oil-based fluid permeable. The selection of the material of the container is based upon the contents of the container. If the contents are large pieces, the container can be net-like having openings smaller than the smallest size of the contents. If the contents are small pieces the container has smaller openings. The container is capable of withstanding the forces exerted thereon by removal from the surface of the article having absorbed oil-based fluid and by recovery of the oil-based fluid. Preferably, the container does not become clogged with the oil-based fluid to the extent that clogging prevents or inhibits absorption of the oil-based fluid by the fiber or cloth.

Suitable containers include the cloth, plastic netting, cotton sheet, perforated plastic sheet and the like.

The absorbent article containing fiber or cloth, that has been shredded absorbs oil-based fluid faster than the article of sheet-form absorbent cloth. This difference in absorption rate is presently believed to be due to the increase in surface area of the fibers and the shredded cloth as opposed to the surface area of the unshredded cloth. The absorbent article made from sheet-form absorbent cloth is preferred for use as a containment boom because the rate of absorption is slower as compared to the absorbent article containing fibers or shredded cloth. The absorbent article containing fibers or shredded absorbent cloth is preferred for recovering oil-based fluid within the contained oil-based fluid spill as this absorbent article can recover oil-based fluid faster than the absorbent article containing sheet-form cloth.

The components of the absorbent article can be selected so that the absorbent article can be reused in excess of about 20 times. Selection of the cloth produced by Malden and a polyethylene foam flotation material can result in the absorbent article being utilized in excess of 40 times.

The dimensions of the absorbent article are limited only by the ability of the user to handle the absorbent article having absorbed oil-based fluid. Thus, the absorbent article can be relatively small for hand use or can be made relatively large as when a mechanical recovering apparatus will be deploying and retrieving the absorbent article and recovering the absorbed oil-based fluid therefrom.

The force applied to the article having absorbed oil-based fluid is preferably effective to temporarily reduce the thickness of the article to about two-thirds of its original thickness.

Representative oil-based fluids that can be recovered include liquids such as: crude oils; mineral oils, e.g., petroleum and petroleum-derived, e.g., lubricants; fuel oils and the like; vegetable oils, e.g., drying oils, non-drying oils and the like; animal oils, e.g., fish oils, sperm oil and the like; and the like. A representative lubricant is motor oil. Representative fuel oils include diesel fuel, gasoline and the like. Representative drying oils include linseed oil, tung oil and the like. Representative non-drying oils include caster oil, coconut oil and the like. Representative surfaces from which the oil-based fluid can be recovered are liquid surfaces and solid surfaces. Representative of the liquid surfaces are the surfaces of oceans, lakes, rivers and the like. Representative of the solid surfaces are floors, rocks, shores, river banks and the like.

The following examples are provided by way of illustration and not limitation.

EXAMPLE 1: TESTING OF ABSORBENCY OF VARIOUS FIBER SAMPLES

Fiber samples of seven commercial products were obtained from DuPont and tested to quantitatively determine how well oil-based fluid was absorbed. In this test, about three or four pieces of fiber were randomly positioned next to each other. A drop of No. 2 diesel oil was picked up with a nut picker and placed in contact with the fibers. The absorbency of the fibers was then expressed as follows. The fiber does work, the fiber works a little, the fibers works but not well, or the fiber does not work based on how the fiber pulled the diesel oil form the nut picker.

The fibers that did work were: Dacron ® polyester, 70 denier/34 filament, continuous filament, semidull; DuPont nylon (filament), 400 denier, 68 filament, semidull; and Antron ® nylon, 70 denier-34 filament, ½ Z twist, semidull.

The fiber that worked a little was DuPont nylon (staple), 1½ denier, 1½ inch semidull.

The fiber that worked but not well was Kevlar ® aramid, type 968, 1140 denier.

The fibers that did not work were: Orlon ®; acrylic fiber staple, 3 denier, 1½ inch bright; and Lycra ® spandex.

EXAMPLE 2: ABSORPTION OF NO. 2 DIESEL FUEL

A two ounce sample of 7660 commercially available from Malden was soaked in a sample of No. 2 diesel fuel for a time period of one minute. At the end of that time period the sample was removed and weighed. The sample had absorbed 35.5 ounces of the diesel fuel. Thus, the sample had absorbed 17.75 times its own weight in diesel fuel. Also, the sample retained the diesel fuel therein very well.

A two ounce of Yukon fabric commercially available from Gilford Mills was soaked in a sample of No. 2 diesel fuel for a time period of one minute. At the end of that time period the sample was removed and weighed. The sample had absorbed 17 ounces of the diesel fuel. Thus, the sample had absorbed 8.5 times its own weight in diesel fuel. Also, the sample retained the diesel fuel therein very well.

The method and apparatus of the present invention can be utilized to recover oil-based fluid from a variety of surfaces quickly and efficiently thus minimizing the potential environmental and health hazards of the oil-based fluid that has spilt. The oil-based fluid can be recovered and used commercially. The article can be reused repeatedly and oil-based fluid recovered therefrom after each use.

This invention has been described in terms of specific embodiments set forth in detail, but it should be understood that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed products are considered to be within the purview and scope of this invention and the following claims.

I claim:

1. A method for recovering oil-based fluid from a surface having oil-based fluid thereon comprising the steps of:
   applying to the oil-based fluid on the surface an oil-based fluid absorbent cloth of man-made fibers, the cloth having at least one napped surface that defines voids therein, the nap being formed of raised ends or loops of the fibers;
   absorbing, with the cloth, oil-based fluid;
   feeding the cloth having absorbed oil-based fluid to a means for applying a force to the cloth to recover oil-based fluid;
   minimizing the release of oil-based fluid from the cloth during the feeding step; and
   applying force to the cloth using the force applying means to recover oil-based fluid therefrom.

2. The method in accordance with claim 1 wherein the cloth has structural integrity.

3. The method in accordance with claim 1 further comprising the step of applying to the oil-based fluid flotation material with the cloth.

4. The method in accordance with claim 1 wherein the at least one napped surface has a total nap thickness of up to about 1.5 millimeters.

5. The method in accordance with claim 1 wherein the cloth has a second napped surface and a dense layer disposed between the first and second napped surfaces.

6. The method in accordance with claim 1 further comprising the step of collecting oil-based fluid released from the cloth during the feeding step.

7. The method in accordance with claim 6 further comprising the step of pumping the collected released oil-based fluid.

8. A method for recovering oil-based fluid from a surface having oil-based fluid thereon comprising the steps of:
 applying to the oil-based fluid on the surface an oil-based fluid absorbent cloth of man-made fibers, the cloth having at least one napped surface that defines voids therein, the nap being formed of raised ends or loops of the fibers;
 absorbing, with the cloth, oil-based fluid;
 feeding the cloth having absorbed oil-based fluid to a means for applying a force to the cloth to recover oil-based fluid; and
 applying force to the cloth to recover oil-based fluid therefrom using the force applying means.

9. The method in accordance with claim 8 wherein the feeding step includes the step of minimizing the release of oil-based fluid from the cloth prior to the step of applying force to recover oil-based fluid.

10. The method in accordance with claim 8 wherein the cloth has a nap thickness of up to about 1.5 mm.

11. The method in accordance with claim 8 wherein the cloth has a second napped surface that defines voids therein and a dense layer positioned between the two napped surfaces.

12. The method in accordance with claim 8 further comprising the step of collecting oil-based fluid released from the cloth prior to the step of applying force to recover oil-based fluid.

13. The method in accordance with claim 12 further comprising the step of pumping the collected released oil-based fluid.

14. The method in accordance with claim 8 wherein the feeding step includes the step of minimizing the release of oil-based fluid from the cloth prior to the step of applying force to recover oil-based fluid and wherein the method further comprises the step of collecting oil-based fluid released from the cloth.

15. The method in accordance with claim 14, further comprising the step of pumping the collected released oil-based fluid.

16. A method for recovering oil-based fluid from a surface having oil-based fluid thereon comprising the steps of:
 applying to the oil-based fluid on the surface an oil-based fluid absorbent cloth of man-made fibers, the cloth having at least one napped surface that defines voids therein, the nap being formed of raised ends or loops of the fibers;
 absorbing, with the cloth, oil-based fluid;
 feeding the cloth having absorbed oil-based fluid to a means for applying a force to the cloth to recover oil-based fluid;
 collecting oil-based fluid released from the cloth during the feeding step; and
 applying force to the cloth using the force applying means to recover oil-based fluid therefrom.

17. An oil-based fluid recovery apparatus for recovering oil-based fluid from a surface utilizing an oil-based fluid absorbent article including a cloth capable of absorbing the oil-based fluid, the apparatus comprising:
 the cloth, the cloth being made of man-made fibers and having at least one napped surface that defines voids therein, the nap being formed of raised ends or loop of the fibers;
 means for applying a force to the article to recover oil-based fluid from the article; and
 means for minimizing the release of oil-based fluid from the article prior to the force applying means.

18. The apparatus in accordance with claim 17 wherein the force applying means is a pair of rollers and the minimizing means is an inclined ramp.

19. The apparatus in accordance with claim 17 further comprising means for floating the apparatus on water.

20. The apparatus in accordance with claim 17 further comprising a tank to receive recovered oil-based fluid;
 means remote from the tank for receiving recovered oil-based fluid; and
 means for pumping recovered oil-based fluid from the tank to the remote means.

21. The apparatus in accordance with claim 17 further comprising means for collecting released oil-based fluid operably associated with the minimizing means.

22. The apparatus in accordance with claim 21 wherein the applying means is a hydraulic applying means.

23. An oil-based fluid recovery apparatus for recovering oil-based fluid from a surface utilizing an oil-based fluid absorbent article including a cloth capable of absorbing the oil-based fluid, the apparatus comprising:
 the cloth, the cloth being made of man-made fibers and having at least one napped surface that defines voids therein, the nap being formed of raised ends or loop of the fibers;
 means for applying a force to the article to recover oil-based fluid from the article; and
 means for collecting released oil-based fluid prior to the force applying means.

* * * * *